(12) United States Patent
Ton That (10) Patent No.: US 7,731,847 B2
(45) Date of Patent: Jun. 8, 2010

(54) SUBMERSIBLE REVERSE OSMOSIS DESALINATION APPARATUS AND METHOD

(76) Inventor: Huy Ton That, 5, CH Des Tulipiers, Geneva (CH) 1208

(*) Notice: Subject to any disclaimer, the term of this patent is extended or adjusted under 35 U.S.C. 154(b) by 389 days.

(21) Appl. No.: 11/807,277

(22) Filed: May 25, 2007

(65) Prior Publication Data

US 2008/0290032 A1 Nov. 27, 2008

(51) Int. Cl.
*B01D 61/00* (2006.01)
*B01D 63/00* (2006.01)

(52) U.S. Cl. .............. 210/257.2; 210/652; 210/321.6; 210/170.01; 290/53; 203/10; 203/11

(58) Field of Classification Search .................. None
See application file for complete search history.

(56) References Cited

U.S. PATENT DOCUMENTS

| | | | | |
|---|---|---|---|---|
| 3,171,808 A | * | 3/1965 | Todd | 210/321.6 |
| 4,512,886 A | * | 4/1985 | Hicks et al. | 210/170.05 |
| 4,966,708 A | * | 10/1990 | Oklejas et al. | 210/637 |
| 5,229,005 A | * | 7/1993 | Fok et al. | 210/652 |
| 6,800,201 B2 | * | 10/2004 | Bosley | 210/652 |
| 6,812,588 B1 | * | 11/2004 | Zadig | 290/53 |
| 2004/0206681 A1 | * | 10/2004 | Gordon | 210/259 |

* cited by examiner

*Primary Examiner*—Krishnan S Menon
(74) *Attorney, Agent, or Firm*—Young & Thompson (57) ABSTRACT

An submersible desalination unit composed of a structure containing a water intake system for acquiring sea water, a sea water pre-filtration system for removing lager contaminants and debris, a reverse osmosis system for the purification of the water, a permeate transfer system to carry the water to where it will be used, a power source for powering the equipment used in the process and a control system that operates and monitors the equipment and process of removing salt from the water and transferring the desalinated water to other use and returning the brine solution to the sea.

16 Claims, 6 Drawing Sheets

SUBMERSIBLE REVERSE OSMOSIS DESALINATION APPARATUS AND METHOD

RELATED APPLICATIONS

The present application is related to U.S. Pat. No. 3,456, 802, issued Jul. 22, 1969, included by reference herein.

The present application is related to U.S. Pat. No. 4,125, 463, issued Nov. 14, 1978, included by reference herein.

The present application is related to U.S. Pat. No. 5,229, 005, issued Jul. 20, 1993, included by reference herein.

The present application is related to U.S. Pat. No. 6,800, 201, issued Oct. 5, 2004, included by reference herein.

FIELD OF THE INVENTION

The present invention relates to an apparatus and method for desalination of salt water and, more particularly, to an apparatus and method for desalination of salt water by reverse osmosis.

BACKGROUND OF THE INVENTION

The increasing demand for water among households, industry, the environment, and especially agriculture is making global water scarcity a perilous possibility. However, salt or brackish water is readily available in many areas of the world. In fact, 97 percent of the surface water of the earth is salt water.

Much of the projected increase in water demand will occur in developing countries, where population growth and industrial and agricultural expansion will be greatest. The world's thirst for water is likely to become one of the most pressing resource issues of the 21st Century.

One-quarter of the world's population lives in areas where water is physically scarce, while about one-sixth of humanity—over a billion people—live where water is economically scarce. Declining groundwater supplies, pollution, flooding and drought could well worsen poverty in many areas.

Irrigation already accounts for about two thirds of water use worldwide. As rivers and lakes are dammed, dried up, or polluted, and as food demand grows in the next 50 years, farmers will become increasingly dependent on ground water for irrigation.

Nearly one third of all humanity relies almost exclusively on groundwater for drinking, including the residents of some of the largest cities in the developing world. Today water tables are falling on every continent. The depletion of aquifers is a new problem, one that has emerged only in the half past century or so, because it is only in this period that we have had the pumping capacity to quite literally deplete aquifers.

Desalination of sea water has been practiced for over half a century and is a well known means of water supply in many countries.

Evaporation and reverse osmosis are two common methods to produce fresh water from sea water. Evaporation methods involve heating the sea water, condensing the vapor produced and isolating the distillate.

Reverse osmosis is a membrane separation process in which the water from a pressurized saline solution is separated from the dissolved material by flowing through a membrane.

In U.S. Pat. No. 3,456,802, osmotic membranes units are submerged at great depths in the sea, 3,000 to 4,000 feet, to take advantage of the hydrostatic pressure of the ocean for supplying the necessary differential pressure to the osmotic membranes.

U.S. Pat. No. 4,125,463 discloses a reverse osmosis apparatus placed in a well hole and using the head pressure of the salt water to supply the necessary differential pressure to the osmotic membranes.

In U.S. Pat. No. 5,229,005, a reverse osmosis apparatus is lowered into the ocean by means of lines attached to pulleys, then raised to the surface to remove the fresh water produced. The invention also uses hydrostatic pressure of the ocean for supplying the necessary differential pressure to the osmotic membranes.

U.S. Pat. No. 6,800,201 discloses a large open top metal cylinder anchored to the sea floor with several units of osmotic membranes attached to the side of the cylinder. Due to the pressure differential, freshwater passes through the membranes by reverse osmosis. The brine is disposed back to the ocean by gravity through an opening in the bottom of the cylinder.

Energy costs for desalination of prior inventions is still high, and one of the main drawbacks to the use of reverse osmosis systems as used by the prior art is the pumping energy required for raising the sea water to the pressures necessary for osmotic separation. These pressures are typically in the neighborhood of 800 to 1000 psi. The problem is amplified by the increasing cost of energy and the ongoing decreasing supply of available energy resources.

The above cited prior art inventions have attempted to save pumping energy by using the hydrostatic pressure of the ocean to desalinate seawater by reverse osmosis, but none of them have proved to be practical or economically viable since they all require the invention to be placed at great depths above 3,000 feet in order to obtain the required pressure of 800 to 1000 psi for osmotic separation. The amount of energy saved by such a process is offset by installation and maintenance costs since it requires working in extremely deep waters. Furthermore the important head requires substantial energy to pump the fresh water to the surface.

The present invention is distinguishable from the above prior art in that it can be located at much lower depth, as low as 70 feet. It combines the use of the ocean hydrostatic pressure and the sea currents renewable energy to supply the necessary differential pressure to the osmotic membranes.

It is an object of the present invention to reduce the pumping energy required for the desalination process.

Another object of this invention is the use of renewable energy for the three following pumping processes, contributing to the protection of our environment: pumping to raise the feed water pressure to reverse osmosis operational pressure above 800 PSI, pumping the brine back to the ocean, and pumping the product water to an onshore storage tank and the distribution network.

Another object of this invention is to eliminate the feed water and pre-filtration pumping processes by using exclusively the hydrostatic pressure of the ocean.

Another object of this invention is the discontinued use of land and building facilities for the desalination process. Land leasing, construction and contractor costs can therefore be avoided, reducing substantially the initial capital costs of the project. Only the product water storage will be required onshore.

Another object of this invention is to keep the desalination system unseen from shore, avoiding obnoxious noise and visual impact on the shoreline. Therefore, this invention is submerged at a sufficient depth to allow free maritime traffic over the operating area.

Another object of this invention is to facilitate an increased amount of output of desalinated water without the need to upgrade existing equipment. The vessels of this invention are stand alone and turnkey units, providing a modular plant design that can be easily upgraded and modified. The expansion of present facilities is only limited by the offshore operating area granted by the local authorities.

Another object of this invention is to reduce maintenance and installation cost issues by placing the invention into shallow waters less than 1200 feet, and regular maintenance is possible from the surface without the requirement of divers or submersible maintenance equipment to work on, repair, or maintain the system.

Another object of this invention is to provide the means to be rapidly moved to an alternate location in order to optimize the use of renewable energy resources and/or relocate the location of a source of intake water and the discharge of brine.

Another object of this invention is to produce large quantities of fresh water in locations distant from any public water distribution network or grid power source.

Another object of this invention is to reduce the accumulation of concentrated brine released by conventional desalination plants. Conventional desalination plants release their brine through pipelines laid on the seabed a few miles from shore. In absence of sufficient currents or water mixing at the disposal spot, the accumulation of concentrated brine could be harmful for the sea flora and fauna. This invention is designed to release the brine in the middle of strong sea currents at mid-depth, thus providing a rapid dispersion with minimal impact on the environment.

Another object of this invention is to reduce the risk of sea life impingement through the feed water intake system. Conventional desalination plants use single spot intake systems with particularly strong suction flows, while the modular configuration of this invention allows an efficient dispersion of the suction effect, as the desalination vessels are kept at a specific distance from each other.

Additional features of this invention will be apparent with the following description and accompanying drawings.

SUMMARY OF THE INVENTION

In accordance with the present invention, there is provided an submersible desalination unit composed of a structure containing a water intake system for acquiring sea water, a sea water pre-filtration system for removing larger contaminants and debris, a reverse osmosis system for the purification of the water, a permeate transfer system to carry the water to where it will be used, a power source for powering the equipment used in the process and a control system that operates and monitors the equipment and process of removing salt from the water and transferring the desalinated water to other use and returning the brine solution to the sea.

BRIEF DESCRIPTION OF THE DRAWINGS

A complete understanding of the present invention may be obtained by reference to the accompanying drawings, when considered in conjunction with the subsequent, detailed description, in which.

For purposes of clarity and brevity, like elements and components will bear the same designations and numbering throughout the Figures.

DESCRIPTION OF THE PREFERRED EMBODIMENT

Figure 1:
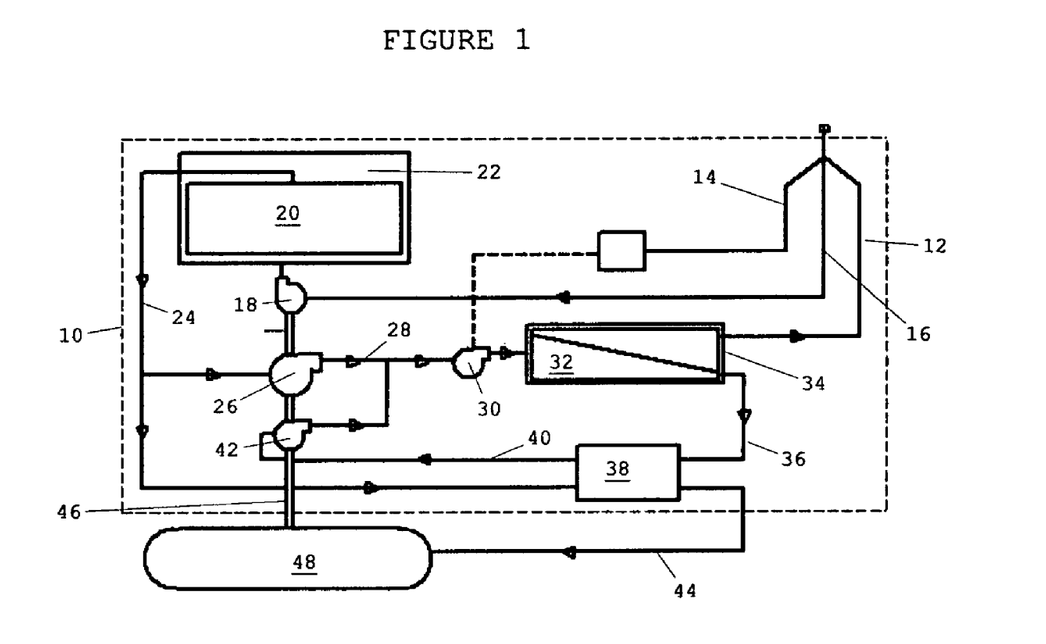
FIG. 1 is a schematic view of a submersible reverse osmosis desalination apparatus.

Referring now to FIG. 1: The apparatus is comprised of equipment necessary for the seawater reverse osmosis contained in a main body or frame 10 removably attached and made of materials not overly subject to the problems of salt or brackish water such as a fiber reinforced plastic intended to be immersed into the marine medium at a depth of less than 1200 ft. A main flexible pipeline 62 and a secondary flexible pipeline 64 which both include a permeate pipeline 12 made of a flexible material substantial enough to withstand sustained external pressures of greater than 34 PSI, a seawater resistant power line 14 such as a WPI Burton Engineering Underwater Power Cable and an air pipeline 16 made of a flexible material substantial enough to withstand sustained external pressures of greater than 34 PSI which therefore connects the apparatus to shore.

Pre-filtration is provided by a set of submerged hollow fiber membranes known as the pre-filtration hollow fiber membrane set 20 commercially available such as a Zenon Zeeweed 500/1000 Reinforced Membranes, located in a pre-filtration membrane housing 22 set at ambient hydrostatic pressure of the ocean. An air blower 18 pump connected to the air pipeline 16 provides the required air flow across the pre-filtration hollow fiber membrane set 20.

The pre-filtered seawater pipes 24 are connecting the pre-filtration hollow fiber membrane set 20 outlet to the pre-filtered water inlets of the main high pressure pump 26, commercially available in the form of a Danfoss Nessie APP 10.2, and the Pressure exchanger energy recovery exchanger 38 commercially available such as a ERI PX Exchanger Pressure Energy Recovery Device—PX 220/180. Pre-filtered water flux is generated by a simultaneous suction effect from the main high pressure pump 26 and the Pressure exchanger energy recovery exchanger 38 pre-filtered water inlets. Therefore the entire pre-filtration process doesn't require water pumping energy.

Prior to entering the reverse osmosis membrane 32, commercially available in the form of a Dow Filmtec SW30XLE-400i, pre-filtered water is pressurized to above 800 PSI by the main high pressure pump 26, the Pressure exchanger energy recovery exchanger 38 and its Pressure exchanger booster pump 42.

A plurality of reverse osmosis membranes is installed inside a pressure vessel 34, commercially available in the form of a Codeline 8" "High-Flow" series 80H Membrane Housing. Pre-filtered feed water pressure buildup inside the pressure vessel 34 provides the required pressure and flow across the reverse osmosis membranes for the seawater reverse osmosis desalination process. The present invention can operate in a multiple pressure vessels configuration.

The Reverse osmosis main feed high pressure pipes 28 are connecting the main high pressure pump 26 and the Pressure exchanger booster pump 42 pre-filtered water outlets to the pressure vessel 34 pre-filtered water inlet.

The Pressure exchanger reverse osmosis feed high pressure pipe 40 connects the Pressure exchanger energy recovery exchanger 38 pre-filtered water outlet to the Pressure exchanger booster pump 42 pre-filtered water inlet.

The hydrostatic pressure of the pre-filtered water allows constant feed water pre-charging for the main high pressure pump 26 and the Pressure exchanger energy recovery exchanger 38. This design eliminates the need of pre-charging the feed water of main high pressure pump 26 which represent an additional source of energy consumption.

The main high pressure pump 26 the Pressure exchanger booster pump 42 and the air blower 18 are removably coupled to the drive shaft 46 of a driving motor such as a sea current powered motor, not shown, which provides the pumping energy. This design allows the entire desalinization process to run on renewable energy using sea currents as the main power source. In an absence of sea currents, the desalination process can also be powered by an optional electric high pressure pump 30 connected to the grid via the power line 14. The electric high pressure pump 30 is commercially available such as a Danfoss Nessie APP 10.2 pump powered by a Reliance Rockwell CLC submersible motor, optional for grid power systems only.

Permeate pumping to shore via the permeate pipeline 12 is powered by throttling the permeate pressure through the reverse osmosis membrane 32 in order to obtain the necessary pressure to overcome the ambient hydrostatic head and the friction loss in the permeate pipeline 12. This design eliminates the need of an additional pumping station for permeate transfer.

The brine rejected by the reverse osmosis membrane 32 is recovered by the Pressure exchanger energy recovery exchanger 38, which uses the brine residual pressure to pressurize part of the pre-filtered feed water flow required by the reverse osmosis membrane 32. The Reverse osmosis brine exit high pressure pipe 36 is connecting the pressure vessel 34 brine outlet to the Pressure exchanger energy recovery exchanger 38 brine inlet.

The Pressure exchanger booster pump 42 compensates the brine's trans-membrane pressure loss, the ambient ocean hydrostatic pressure as well as the small friction loss incurred through the Pressure exchanger energy recovery exchanger 38. The depressurized brine exiting the Pressure exchanger energy recovery exchanger 38 is set at a pre-determined pressure in order to overcome the ambient ocean hydrostatic pressure.

The Pressure exchanger brine exit low pressure pipe 44 is connecting the Pressure exchanger energy recovery exchanger 38 brine outlet to the sea current power converter 48 fins.

The brine is expelled through the fins the sea current power converter 48 in order to enhance the mixing with ambient sea water. This design eliminates the need of an additional pumping station for brine disposal.

A person skilled in the art will notice that the entire process is powered by the main high pressure pump 26 and in a much lesser degree by the Pressure exchanger booster pump 42 avoiding the need of numerous auxiliary pumping services required in a traditional onshore desalination plant.

Figure 2:
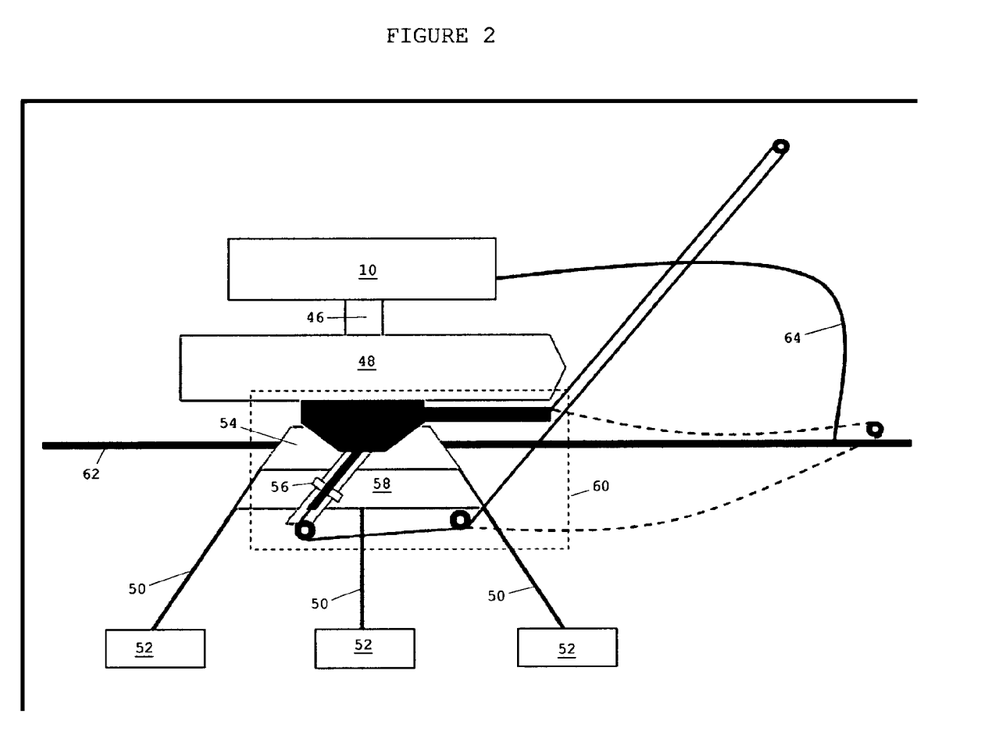
FIG. 2 is a left perspective view of a general view of the desalination unit in operating mode. The vessel is secured inside the main cradle secured to the seabed with 3 vessels anchor lines and concrete blocks. The sea current power converter can rotate freely to position itself to face sea currents for the greatest effect, while the body or frame is kept in a static position to remain permanently connected to the secondary flexible pipeline.

Referring now to FIG. 2; the main body or frame 10 is connected to the sea current power converter 48 via the drive shaft 46 and is maintained in suspension in the water by three vessel anchor lines 50, each one secured by a concrete block 52 laid on the sea floor. Foam inserts are placed inside the main body or frame 10 in order to provide the vessel 90 with light negative buoyancy. The three vessel anchor lines 50 and their respective concrete blocks are disposed in a triangular layout on the ocean floor. The top extremities of the three vessel anchor lines 50 are secured to the main cradle 54 in order to give the mooring system a pyramidal shape. The main cradle 54 includes the docking arm hydraulic locking system 56, the hoisting system 60 as well an embedded buoy 58 filled with synthetic foam which provides strong positive buoyancy.

A vessel 90 is the combination of the main body or frame 10 and the sea current power converter 48.

In a multi-vessel 90 configuration, the main cradle 54 also includes a connection ring on its side (not shown) to host and guide the main flexible pipeline 62 comprised of a plurality of pipelines and power cable, across the array of multiple vessel 90 (s) positioned on a single row layout.

The main body or frame 10 is permanently connected to a secondary flexible pipeline 64 comprised of a plurality of pipelines and power cable and maintained in a static position, the secondary flexible pipeline 64 is connected to the main flexible pipeline 62 while the sea current power converter 48 connected under the main body can rotate freely to position itself to face sea currents for the greatest effect.

The objective of the present invention is also to facilitate access for maintenance. The main body or frame 10 and the sea current power converter 48 can be surfaced without disconnecting any pipeline. The length of the secondary flexible pipeline 64 must at least equal the head distance in order to keep the connection (in a vertical position) with the main flexible pipeline 62 when the vessel 90 is surfaced. When the vessel 90 is submerged and secured in the main cradle 54, the secondary flexible pipeline 64 runs parallel to the main flexible pipeline 62. Therefore the junction point between the secondary flexible pipeline 64 and the main flexible pipeline 62 must be located at an equal distance required for surfacing away from the main body.

A person skilled in the art will notice that in order to surface the system without disconnecting the pipelines, the vessel 90 must travel in a vertical angle of 45 degrees, and the minimum distance to keep between vessels in a multi-vessel 90 configuration represents approximately the head distance.

Figure 3:
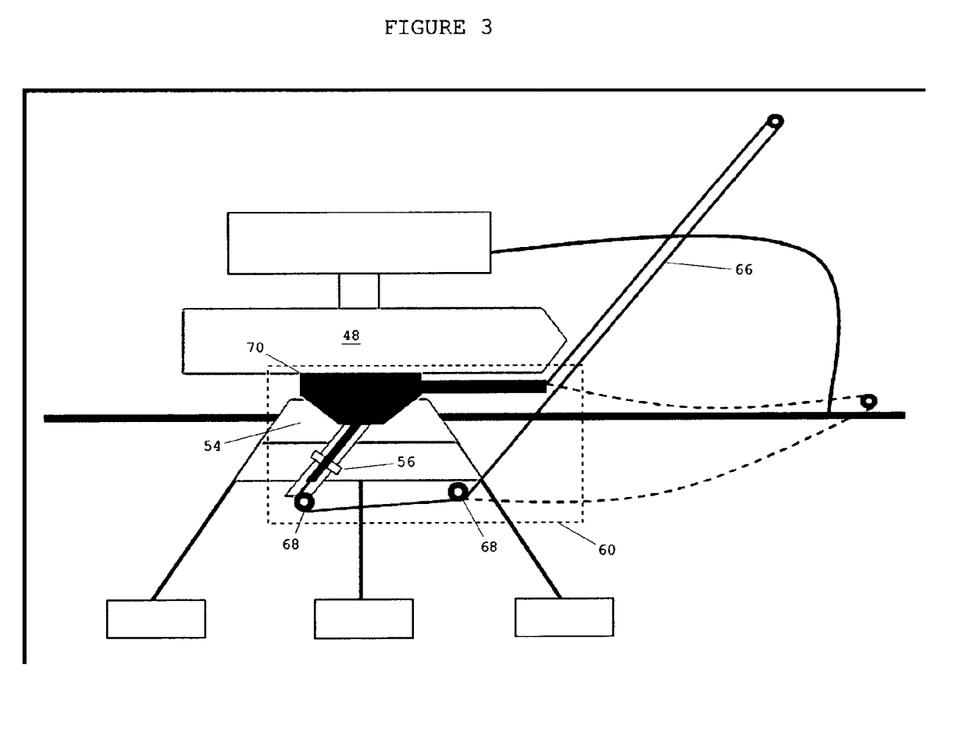
FIG. 3 is a left perspective view of a hoisting system. The hoisting system is designed to provide the vessel with a vertical 45 degrees travel angle for surfacing and immersion without disconnecting the secondary flexible pipeline. The hoisting pulley line can be retrieved from the surface by the maintenance team. Once the docking arm is released from the main cradle, the entire vessel can be hoisted to the surface by acting on the hoisting pulley line from the maintenance barge using an electric winch (not shown)

Referring now to FIG. 3; the hoisting system 60 provides the vessel 90 with a vertical 45 degrees travel angle. It includes a closed loop hoisting pulley line 66 which is guided by two hoisting pulley guides 68 mounted on the main cradle 54. The hoisting pulley line 66 is also linked to the docking arm 70 of the sea current power converter 48 so that the entire vessel 90 can be hoisted to the surface by pulling on one end of the hoisting pulley line 66.

The vessel's docking arm 70 has a shape of a rudder and is designed to fit exactly the female aperture (not shown) in the main cradle 54. This design ensures vertical and horizontal stability under strong sea currents. The docking arm hydraulic locking system 56 integrated in the main cradle 54 secures the vessel's docking arm 70 to the main cradle 54. It can be remotely operated from shore via a servo motor (not shown).

Figure 4:
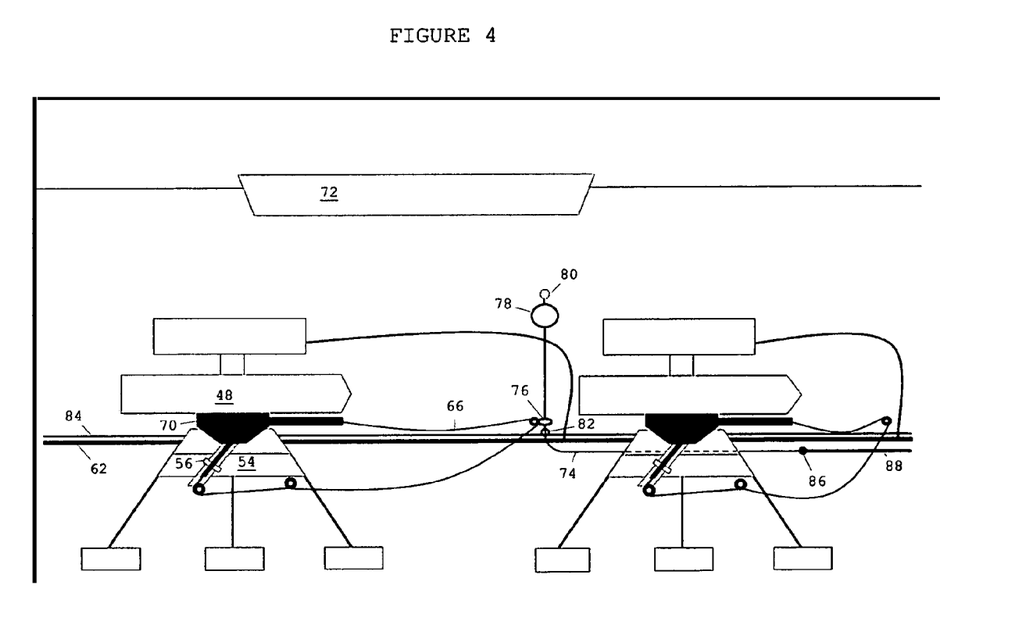
FIG. 4 is a left perspective view of a multi-vessel configuration in operating mode. The vessels are secured inside their respective main cradle, each secured to the seabed with 3 vessels anchor lines and concrete blocks. The hoisting pulley lines are set in operating mode, parallel to the main flexible pipeline. The maintenance mooring lines are fully retracted and the mooring line ring and its buoy are in idle mode.

Referring now to FIG. 4; in normal operation mode, the vessel's docking arm 70 is secured in the main cradle 54. The hoisting pulley line 66 is positioned horizontally along the main flexible pipeline 62 leading to a neighboring vessel 90. A maintenance barge mooring line 74 is linked with a snap hook 76 to the opposite end of the hoisting pulley line 66, away from the main cradle 54. The snap hook 76 is also hooked to a mooring line ring 78 equipped with a small mooring line buoy 80 on its top.

The maintenance barge mooring line 74 is used by the maintenance barge 72 to maintain a static position at the surface of the ocean. It is running through the main static line ring 82 mounted on the main static line 84 running parallel to the main flexible pipeline 62 and linking each cradle in a multi-vessel 90 array configuration. The maintenance barge mooring line 74 has a mooring line stopper 86 at its end extremity opposite to the snap hook 76, preventing the line to exit the main static line ring 82. In normal operation mode, the maintenance barge mooring line 74 is also maintained under tension by an elastic cable 88 secured to the next vessel 90 of the array.

Figure 5:
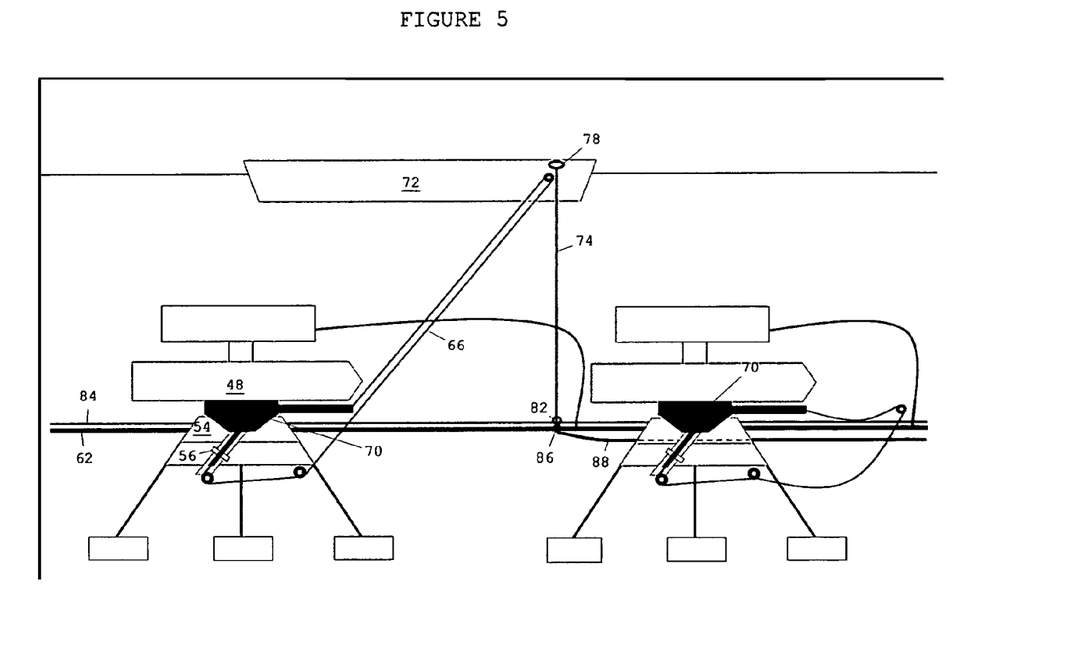
FIG. 5 is a left perspective view of a multi-vessel configuration in pre-hoisting mode. For any vessel requiring maintenance, its maintenance barge mooring line and the hoisting pulley line are retrieved from the surface up to the maintenance barge using the mooring line ring. The fully extended mooring line is then secured to the maintenance barge, while the hoisting pulley line is connected to an electric winch mounted on the maintenance barge (not shown), ready for the vessel hoisting operation.

Referring now to FIG. 5; whenever the vessel 90 needs to be surfaced for maintenance, the docking arm 70 is first disengaged from the main cradle 54. A long pole (not shown) lowered from the maintenance barge 72 is used to hook the mooring line ring 78 and bring it to the surface.

As the mooring line ring 78 is hooked to the snap hook 76, it will pull along the extremities of the maintenance barge mooring line 74 and the hoisting pulley line 66 to the surface.

An alternate method to bring the maintenance barge mooring line 74 to the surface would be to use a remote controlled electric winch (not shown) mounted on the main cradle 54. The maintenance barge mooring line 74 is mounted on the electric winch (not shown) which has full control on the released length of the maintenance barge mooring line 74.

Once the mooring line ring 78 is surfaced, the maintenance barge mooring line 74 extremity is unhooked from the snap hook 76 and secured to the maintenance barge 72. The hoisting pulley line 66 is also unhooked from the snap hook 76 and installed in a power wheel (not shown) driven by an electric motor (not shown).

As a consequence, the maintenance barge mooring line 74 is kept in a vertical position and the hoisting pulley line 66 at an angle of 45 degrees between the main cradle 54 and the maintenance barge 72.

Figure 6:
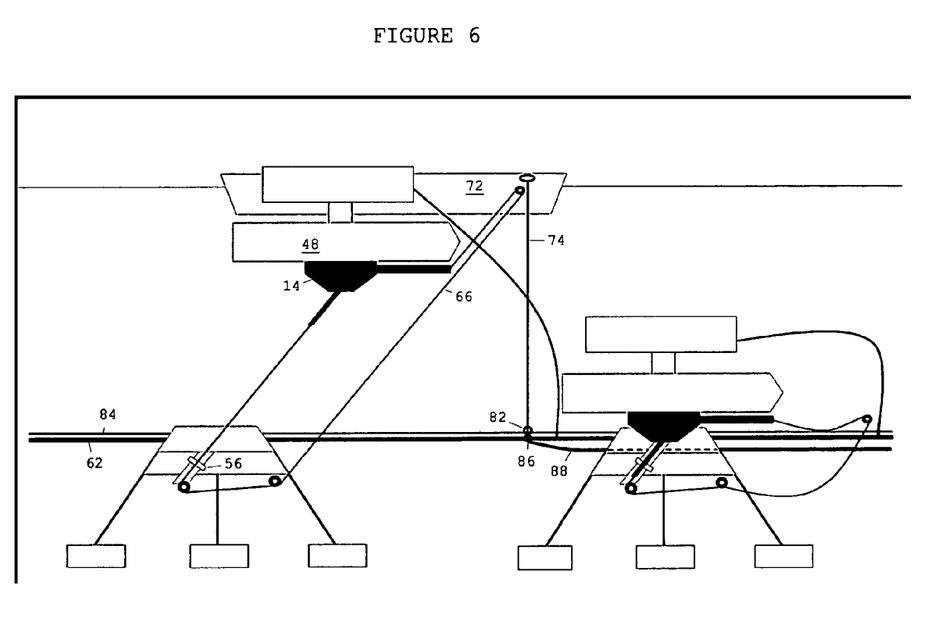
FIG. 6 is a left perspective view of a multi-vessel configuration in hoisting mode. The vessel requiring maintenance is first released from its main cradle. In a second step, the maintenance barge electric winch (not shown) acts on the hoisting pulley line to surface the vessel and bring it underneath the maintenance barge, then through the maintenance barge's opening designed to host the top of the vessel. Maintenance can then be done from the maintenance barge pontoon all around the top of the vessel. Once maintenance is completed, the vessel is immersed then secured in its main cradle following the inverse procedure as for surfacing. It is to be noted that the secondary flexible pipeline is never disconnected from the vessel during hoisting operation.

Referring now to FIG. 6; The vessel 90 can then be surfaced or submerged by acting on either side of the hoisting pulley line 66 from the maintenance barge 72 (using an electric motor not shown), without disconnecting any pipeline. In order to facilitate maintenance, the maintenance barge 72 is designed with an open area in its center (not shown) to host the main body of frame once it is surfaced. This allows the maintenance team to work all around the desalination unit with better access to its main components.

A person skilled in the art will notice that the maintenance barge 72 is actually using the mooring infrastructure of two vessels to maintain its static position at the surface. This design can guarantee smooth operational conditions even under strong surface currents.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Having thus described the invention, what is desired to be protected by Letters Patent is presented in the subsequently appended claims.

What is claimed is:

1. A submersible reverse osmosis desalination apparatus for removing salt from sea water producing potable water, comprising:
   a plurality of desalination units, each unit comprising:
      a power means for converting sea current to power at a depth of less than 1200 feet,
      a filtration means for filtering sea water via reverse osmosis filtration producing the potable water, the filtration means held in a containing means and connected to and powered by the power means,
      a securing means for securing the power means and the filtration means to and ocean floor, said securing means comprising a buoyancy means for providing positive buoyancy and an anchor means holding the securing means in a static position relative to the ocean floor,
      a maintenance means for hoisting the connected filtration means and the power means from the ocean floor to a surface and lowering the connected filtration means and the power means from the surface to the ocean floor, and
      a locking means for locking the connected filtration means and the power means to said securing means;
   a transfer means for transferring desalinated water from the apparatus to shore and delivering electricity to each desalination unit of the plurality of desalination units to power monitoring equipment, and to provide air supply to pre-filtration air blower of each unit; and
   a flexible connecting means for connecting each filtration means of the plurality of desalination units to the transfer means,
   wherein the maintenance means raises and lowers the connected filtration means and the power means of a first desalination unit of the plurality of desalination units without interrupting the flow of the desalinated water in the transfer means or the desalination of water by other desalination units of the plurality of desalination units.

2. A submersible reverse osmosis desalination apparatus for removing salt from sea water producing a potable water, comprising:
   a plurality of connected desalination units, each unit comprising:
      a fiber reinforced plastic main body or frame containing components of filtering unit for reverse osmosis desalination producing the potable water, a power generating sea current power converter, converting sea energy into rotating power to power said filtering unit, said filtering unit connected to said filtering unit to form a vessel, a fiber reinforced plastic docking arm hydraulic locking system connected to said vessel, a fiber reinforced plastic main cradle comprising a foam buoy providing positive buoyancy and strong vessel anchor lines securing the fiber reinforced plastic main cradle to the sea floor, a flexible, strong, seawater resistant hoisting system, surfacing and submerging the vessel, including the sea current power converter, and a swash plate, positive displacement electric high pressure pump making up missing power when sea currents are insufficient to power the sea current motor;

a flexible, strong main flexible pipeline, for transporting the potable water to shore, delivering electricity to each vessel in the plurality of connected desalination units to power monitoring equipment, and to provide air supply to a pre-filtration air blower of each unit; and a flexible, strong secondary flexible pipeline, forming a junction between each vessel of the plurality of connected desalination units and the main flexible pipeline, the secondary flexible pipeline transferring portable water to the main flexible pipeline, wherein, the seawater resistant hoisting system allows the surfacing of the vessel of a first unit of the plurality of connected desalination units without interrupting the flow of the potable water via the main flexible pipeline and without interrupting filtering by other units of the plurality of connected desalination units, and said fiber reinforced plastic docking arm hydraulic locking system locks and secures the vessel to the cradle upon submerging the vessel by the seawater resistant hoisting system.

3. The submersible reverse osmosis desalination apparatus in accordance with claim 1, wherein said means for containing the components of the apparatus comprises a fiber reinforced plastic main body or frame.

4. The submersible reverse osmosis desalination apparatus in accordance with claim 1, wherein said transfer means for transferring potable water from the apparatus to shore comprises a flexible, reinforced permeate pipeline.

5. The submersible reverse osmosis desalination apparatus and method in accordance with claim 1, wherein said means for supplying air to the air blower comprises a flexible, reinforced air pipeline.

6. The submersible reverse osmosis desalination apparatus in accordance with claim 1, further comprising:

a second power means for making up missing pressure when sea currents are insufficient to power the sea current motor comprises a swash plate, positive displacement electric high pressure pump.

7. The submersible reverse osmosis desalination apparatus in accordance with claim 1, wherein said filtration means for seawater reverse osmosis filtration comprises a semi-permeable reverse osmosis membrane.

8. The submersible reverse osmosis desalination apparatus in accordance with claim 1, further comprising:

a housing means for housing the reverse osmosis membranes, wherein said housing means comprises a fiber reinforced plastic pressure vessel.

9. The submersible reverse osmosis desalination apparatus in accordance with claim 1, wherein said anchor means comprises a flexible, strong vessel anchor lines.

10. The submersible reverse osmosis desalination apparatus in accordance with claim 1, wherein said securing means comprises a fiber reinforced plastic main cradle.

11. The submersible reverse osmosis desalination apparatus in accordance with claim 1, wherein said locking means comprises a fiber reinforced plastic docking arm hydraulic locking system.

12. The submersible reverse osmosis desalination apparatus in accordance with claim 1, wherein said buoyancy means comprises a synthetic foam buoy.

13. The submersible reverse osmosis desalination apparatus in accordance with claim 1, wherein said maintenance means comprises a seawater resistant hoisting system for hoisting and lowering the connected filtration means and the power means.

14. The submersible reverse osmosis desalination apparatus in accordance with claim 1, wherein said transfer means comprises a flexible, strong main flexible pipeline.

15. The submersible reverse osmosis desalination apparatus in accordance with claim 1, wherein said flexible connecting means comprises a flexible, strong secondary flexible pipeline.

16. The submersible reverse osmosis desalination apparatus in accordance with claim 1, wherein said maintenance means comprises a rigid, sea water resistant docking arm.

* * * * *